Feb. 17, 1953     J. R. TURNER     2,628,584
METAL SHAPING MACHINE
Filed Feb. 10, 1951     2 SHEETS—SHEET 1

INVENTOR.
JOHN R. TURNER

Feb. 17, 1953   J. R. TURNER   2,628,584
METAL SHAPING MACHINE
Filed Feb. 10, 1951   2 SHEETS—SHEET 2
FIG. 2
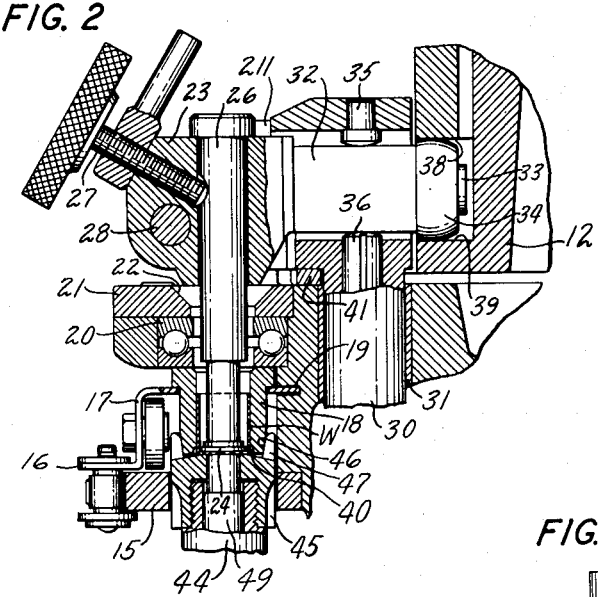
FIG. 3
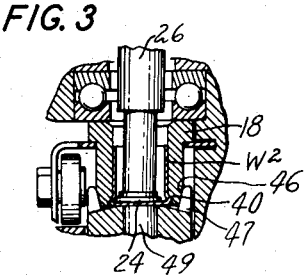
FIG. 5
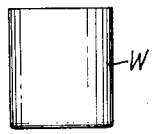
FIG. 6
FIG. 4
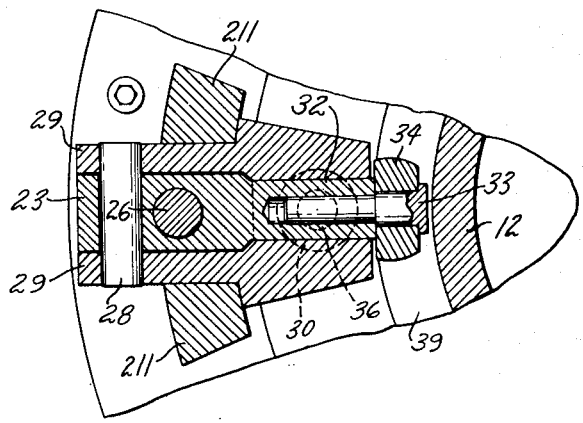
INVENTOR.
JOHN R. TURNER
BY

Patented Feb. 17, 1953

2,628,584

UNITED STATES PATENT OFFICE 2,628,584

METAL SHAPING MACHINE

John R. Turner, Glen Mills, Pa., assignor to Remington Arms Company, Inc., Bridgeport, Conn., a corporation of Delaware Application February 10, 1951, Serial No. 210,384

7 Claims. (Cl. 113—52)

1

This invention relates to apparatus for forming an interior peripheral enlargement in a cup or cylinder-shaped workpiece.

More specifically, the invention contemplates an improved means for interiorly enlarging or "half heading" the cup or cap in process of being formed into a shot shell head.

In the drawings:

Fig. 2 is a sectional elevation of a portion of the mechanism showing the working parts displaced vertically to work-engaging position.

Fig. 3 is a sectional elevation of a portion of the mechanism shown in Fig. 2 with the spinning tool or head former in engagement with the work.

Fig. 4 is a fragmentary horizontal section substantially on the line 4—4 of Fig. 1.

Fig. 5 illustrates a workpiece as fed to the machine.

Fig. 6 shows a workpiece as delivered from the machine.

Figure 1:
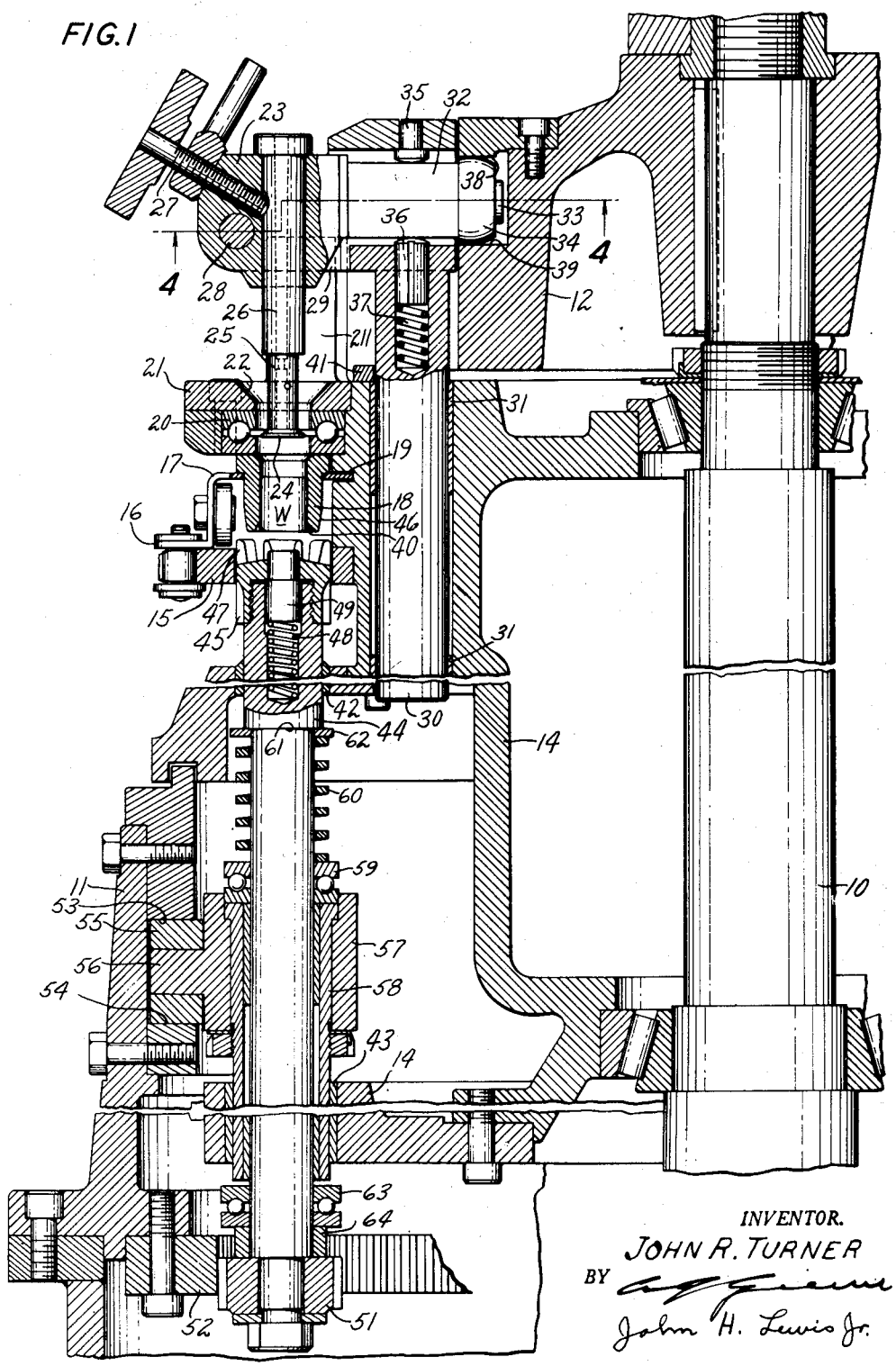
Fig. 1 is a fragmentary sectional elevation of a machine including one form of the invention, the working parts being shown in retired or normal position.

The apparatus of this invention is preferably but not necessarily one unit of a composite machine for the continuous assembly of empty primed shot shells from their components, in which machine the various components are prepared and brought together by means of a series of continuously moving conveyor chains which transport the work from one operating unit to another.

The half-heading unit of this invention comprises a fixed central pedestal 10 secured to a fixed base (not shown), a fixed cylindrical frame or skirt 11 secured to said base, and a fixed substantially cylindrical cam forming and holding frame 12 adjustably secured to pedestal 10. Supported from and revolving about pedestal 10 is a turret frame identified generally by the numeral 14, to which are secured directly or indirectly all other parts of the machine to be described except the conveyor chain and work carriers associated therewith. Fixed to turret frame 14 is a sprocket wheel 15 driven by a conveyor chain 16. Appropriately secured to chain 16 are upwardly and laterally extending arms 17 apertured to receive bushings 18 each of which constitutes a die for holding a workpiece W while a tool operates thereon. As each workpiece holding bushing traverses the turret, the terminal portion of the holding arm 17 is engaged in a kerf 19 in the turret frame, and the bushing

2 itself is vertically aligned with the aperture of a ball bearing member 20 appropriately secured to a ring 21 which is in turn secured to the turret frame 14. Said ring 21 comprises a series of apertures which have upwardly and outwardly flared mouth portions 22 and are aligned with the apertures of bearings 20 as well as with tool-holder-receiving apertures in tool holder carriers 23. Each of the working tools comprises a head portion 24 of the desired configuration and preferably rotatably held on a shank portion 25 received in a recess in a tool holder 26 which in turn is received in the aperture of tool holder carrier 23 in which it is secured by suitable means such as set screw 27. Each tool holder carrier 23 is pivoted at 28 between the laterally extending arms 29 of a tool carrier holding frame, which frame likewise comprises integral with or rigidly secured to the arms 29 a vertically disposed post 30 mounted for vertical sliding movement in bearings 31 in frame 14. Each tool frame is guided in its vertical reciprocation by rectilinear posts 211 secured to or integral with ring 21. Each tool holder carrier 23 comprises an inwardly extending shank portion 32 apertured to receive a stud 33 which carries a cam following roller 34. The shank portion 32 is normally located and held with respect to the frame 29 between a fixed stud 35 and a spring follower 36 urged upwardly by a spring 37 housed in a recess in the post 30. Cam follower 34 is controlled by a fixed box cam comprising a downwardly facing roller engaging surface 38 and an upwardly facing roller engaging surface 39.

The normal or retracted position of the mechanism above described is shown in Fig. 1. The tool frame is elevated so that the tool head 24 stands within the bearing 20 and clear of the bushing receiving space below this bearing. The configuration of cam 38—39 is such that as the turret rotates about this fixed cam the tool frame is lowered to the Fig. 2 position, in which the tool has entered the workpiece to the desired extent, the tool head 24 being opposite an interior enlargement 40 of bushing or die 18 into which the stock of the workpiece is to be displaced. The undersurface of the horizontally disposed portion 29 of the tool frame has engaged the upper surface of a stop block 41 secured to turret frame 14, preventing further downward movement of the tool frame 29. In further rotation of the turret, roller 34 receives an additional increment of downward movement which has the effect of rocking the tool carrier 23 about pivot 28 against the compression of spring 37 transmitted to the shank 32 of the tool carrier through spring follower 36. The workpiece being properly positioned in the manner hereinafter described, the effect of rocking the tool carrier about pivot 28 is to displace the tool head 24 laterally into the engagement with the work which is necessary to form the desired interior enlargement.

The means for supporting and rotating the work in cooperation with the downwardly and laterally displaceable tool above-described may be as follows:

Mounted for reciprocation and rotation in suitable bearings 42 and 43 in the turret frame 14 is a work-supporting stem 44. The upper portion of the stem 44 has secured thereto a head 45 comprising an end recess the periphery of which is inclined at an angle corresponding to the configuration of the lower and exteriorly inclined face 46 of the bushing 18. The walls of said recess may be slotted through to form separate recess defining lugs 47. The head 45 is apertured, and the upper portion of stem 44 is recessed to receive spring 48 and spring follower 49, said spring follower having the function of temporarily holding in bushing 18 such workpieces as may fit loosely therein, and being retired by the engagement of tool head 24 with the workpiece head interior. Stem 44 is rotated through the engagement of pinion 51 secured to the lower end of said stem with a ring gear 52 secured to the fixed frame or skirt 11. Said stem 44 is raised and lowered by means of a box cam 53—54 secured to skirt 11 and engaged by a roller 55 carried on a stud 56 projecting laterally from an annular member 57 secured to a sleeve 58 mounted on stem 44. Upward movement of sleeve 58 is transmitted to stem 44 through ball bearing 59, coil spring 60, washer 62, and shoulder 61. Downward movement of sleeve 58 is similarly transmitted to stem 44 through ball bearing 63, spacing collar 64, and the upper face of pinion 51.

The normal position of the bushing supporting and rotating means is shown in Fig. 1. Stem 44 is lowered to such an extent that the recess forming lugs 47 clear a bushing 18 as such bushing advances laterally into the space between said lugs and the bearing member 20. The bushing being properly positioned in alignment with the head 45 of stem 44, said stem is elevated by fixed cam 53—54, the upward displacement of cam roller 55 being transmitted to the stem in the manner above-described. The tapered lower end of the bushing is engaged within the counterpart recess formed by lug 47 and the bushing is lifted into engagement with bearing member 20. Since stem 44 is constantly rotated, due to the engagement of pinion 51 with ring gear 52, the bushing and workpiece contained therein will be rotated, the bushing being firmly held between head 45 and bearing 20. While the bushing and the workpiece therein are being so positioned, the tool 24—25 is first lowered into the workpiece as above described. The tool is then moved laterally as illustrated in Fig. 3 and spins the workpiece to the configuration shown as $W_2$, Fig. 6. Further rotation of the turret restores the parts first to the Fig. 2 position and then to the Fig. 1 position, ready to repeat the cycle.

It will be understood that the turret may carry any desired number of tools and associated parts, the spacing of such parts corresponding to the spacing of the work holders on chain 16, likewise that the specific embodiment of the invention illustrated is susceptible to many variations falling within the scope of the appended claims.

What is claimed is:

1. Apparatus for the forming of an interior peripheral enlargement on a cup-shaped workpiece comprising a forming tool, a work holding die, means for conveying said die to a position in alignment with said tool, means for effecting relative movement of said die and tool to position said tool within the workpiece in said die, means for rotating said workpiece while said tool is so positioned, means for shifting said tool laterally to engage the periphery of said workpiece, and means for disengaging said tool from said workpiece.

2. Apparatus for the spinning of a peripheral enlargement on the interior of a workpiece comprising a workpiece holding die, means for conveying said die into alignment with a spinning tool assembly; said spinning tool assembly comprising a tool frame mounted for reciprocating movement, a tool carrier movably held in said frame, and a spinning tool supported by said tool carrier; and means for sequentially advancing said tool frame to position said tool within the workpiece in said die and shifting said tool carrier on said frame to engage said tool with said workpiece, said means comprising a cam follower mounted on said tool carrier and a cam engaged by said cam follower.

3. Apparatus for the spinning of a peripheral enlargement on the interior of a workpiece comprising means for conveying said workpiece into alignment with a spinning tool assembly; said spinning tool assembly comprising a tool frame mounted for reciprocating movement, a tool carrier movably held in said frame, and a spinning tool supported by said tool carrier; means for sequentially advancing said tool frame to position said tool within said workpiece and shifting said tool carrier on said frame to engage said tool with said workpiece, said means comprising a cam follower mounted on said tool carrier and a cam engaged by said cam follower; means for transmitting the movement of said tool carrier to said tool frame; a stop for arresting the movement of said tool frame; and means for moving said tool carrier on said tool frame after said tool frame has engaged said stop.

4. Apparatus for the spinning of a peripheral enlargement on the interior of a workpiece comprising means for conveying said workpiece into alignment with a spinning tool assembly; said spinning tool assembly comprising a tool frame mounted for reciprocating movement; a tool carrier pivotally mounted on said frame; a spinning tool supported by said tool carrier; means for advancing said tool frame to position said tool within said workpiece without relative displacement of said tool carrier and tool frame, comprising a cam follower mounted on said tool carrier; a stop for arresting the advance movement of said tool frame; and means for rocking said tool carrier about its pivot while said tool frame engages said stop to engage said tool with said workpiece.

5. Apparatus for spinning a peripheral enlargement on the interior of a workpiece comprising a workpiece holding die, means for moving said die into alignment with a supporting stem, a bearing adapted for engagement by said die, means for revolving said stem, yielding means for shifting said stem to engage and move said die into contact with said bearing, a spinning tool, and means operating in synchronism with said stem shifting means for first moving said spinning tool into the workpiece in said die and subsequently shifting said spinning tool to engage and operate on said workpiece.

6. Apparatus for the continuous operation on a sequence of cup-shaped workpieces to form a peripheral enlargement in such workpieces comprising a conveyor, a turret traversed by said conveyor, a sequence of workpiece holders on said conveyor, a sequence of tools on said turret, a sequence of workpiece lifting and rotating means on said turret associated respectively with said tools, actuating means for said workpiece lifting and rotating means, and means operating in synchronism with said workpiece lifting and rotating means for shifting said tools laterally into engagement with the peripheries of said workpieces.

7. Apparatus for the continuous operation on a sequence of cup-shaped workpieces to form a peripheral enlargement in such wirkpieces comprising a continuously revolving turret, a conveyor traversing said turret, a sequence of workholding dies loosely held on said conveyor, a die supporting stem on said turret, means for rotating said die supporting stem, cam actuated means having a yielding connection to said stem for shifting said stem to displace said die relative to said conveyor, a bearing on said turret adapted to be engaged by said die when so displaced, a spinning tool assembly on said turret comprising a tool frame, a tool carrier, and a tool on said carrier; and cam means operating in synchronism with said stem shifting means for first shifting said tool frame to move said tool into a workpiece in said die and subsequently moving said tool carrier with respect to said tool frame to engage said tool with a workpiece in said die.

JOHN R. TURNER.

REFERENCES CITED

The following references are of record in the file of this patent:

UNITED STATES PATENTS

| Number | Name | Date |
|---|---|---|
| 517,382 | Haberman | Mar. 27, 1894 |
| 1,594,657 | Burns | Aug. 3, 1926 |
| 1,609,986 | Brenzinger | Dec. 6, 1926 |
| 2,495,291 | Schlitters | Jan. 24, 1950 |
| 2,567,334 | Harrison et al. | Sept. 11, 1951 |